United States Patent [19]

Ketch

[11] Patent Number: 5,282,749
[45] Date of Patent: Feb. 1, 1994

[54] METHOD AND APPARATUS FOR TEACHING CHILDREN HOW TO FOLD CLOTHES AND OTHER OBJECTS

[76] Inventor: Stephen R. Ketch, 1097 NW. 81st Ter., Plantation, Fla. 33322

[21] Appl. No.: 847,845

[22] Filed: Mar. 9, 1992

Related U.S. Application Data

[63] Continuation of Ser. No. 540,179, Jun. 19, 1990, abandoned

[51] Int. Cl.$^5$ ...................... G09B 25/00; A41D 11/00
[52] U.S. Cl. .................... 434/395; 434/247; 434/258; 434/433; 446/488; 2/243.1
[58] Field of Search .............. 434/395, 247, 258, 260, 434/433; 446/79, 80, 474, 487, 488; 5/497, 500, 485; 2/115, 244, 175, 243 R

[56] References Cited

U.S. PATENT DOCUMENTS

| | | | |
|---|---|---|---|
| 3,878,638 | 4/1975 | Benjamin | 446/488 |
| 4,253,197 | 3/1981 | Posta | 434/260 X |
| 4,530,349 | 7/1985 | Metzger | 434/260 X |
| 4,934,939 | 6/1990 | Bonneville | 5/485 X |

OTHER PUBLICATIONS

Trademark Search Report and products cited therein. Mar. 16, 1990.
Spacecraft & Spacemen to Color, Cut & Fly!, Richard Wagner, 1977.
Trademark Research Report, Thomson & Thomson, Mar. 9, 1990.

*Primary Examiner*—Gene Mancene
*Assistant Examiner*—L. Thomas
*Attorney, Agent, or Firm*—Morgan & Finnegan

[57] ABSTRACT

Children's clothing with matching decorative indicia for teaching relatively young children how to fold their clothing are disclosed. Either matching pair of decorative illustrations, such as blocks with letter or numbers, or foldline illustrations are placed on the clothing. The clothing is folded by sequentially matching the paired illustrations or folding along the foldline illustrations.

18 Claims, 7 Drawing Sheets

METHOD AND APPARATUS FOR TEACHING CHILDREN HOW TO FOLD CLOTHES AND OTHER OBJECTS

This is a continuation of co-pending application Ser. No. 540,179 filed on Jun. 19, 1990, and abandoned upon the filing this application.

BACKGROUND AND OBJECTS OF THE INVENTION

1. Field of Invention

A method and articles of clothing designed to teach relatively young children how to fold the articles of clothing. The method and articles of clothing utilizes the placement of either matching pairs of illustrations or fold line illustrations on the article of clothing to be folded. By sequentially matching the paired illustrations, or folding along the fold line illustrations, the article of clothing [or other object] is properly folded.

2. Description of the Prior Art

Children of relatively young ages have great difficulty in learning how to properly fold clothes. With younger children, efforts utilized in teaching the proper method of folding often becomes extremely frustrating for both children and parents. As a result, parents avoid teaching children how to fold clothes while the task of folding becomes a chore without reward.

The complexity of folding is related to the fact that in order to properly fold a shirt, a pair of pants, or skirt, various steps must be taken to properly fold different portions of the object on top of itself to arrive at a proper fold. To perform the proper folding steps children need to comprehend the geometry associated with each object as well as the proper placement of portions of the object on top of itself to arrive at a completed proper fold. These concepts are difficult for young children to comprehend and remember and are never considered an enjoyable or educational opportunity. Accordingly, parents often fold their childrens' clothes and defer teaching their children how to fold until later years.

Relatively young children do have certain skills that can be used to overcome these problems. Specifically, children of relatively young ages can recite the alphabet, count number, recognize patterns and pictures and assimilate various other similar concepts. Additionally, children enjoy participating in events where they can apply their newly learned skills to the world around them and often enjoy receiving an indication or reward for having completed a task properly. Finally, it has been found that children enjoy using their sense of touch, sound and sight in combination while learning, often responding quickly to such multisensory experiences. Nevertheless, these skills have not been applied to teaching children how to fold clothes or other objects.

Various attempts have been used to teach children how to dress. In particular, U.S. Pat. No. 4,253,197 to Posta and U.S. Pat. No. 3,775,775 to Mazzenga are generally directed to solving such efforts. Other attempts have been used to entertain or educate children by placing illustrations on garments. Specifically, U.S. Pat. No. 3,724,101 to Slezak and U.S. Pat. No. 4,710,979 to Poole et al.

None of the apparatuses or methods disclosed in the above-identified U.S. patents disclose a method or apparatus for teaching children how to properly fold clothes.

Therefore, the principal object of this invention is to provide clothing suitable for teaching children how to properly fold their clothes.

Another object of this invention is to teach children how to properly fold their clothes by sequentially matching pairs of illustrations.

Another object of this invention is to teach children how to properly fold their clothes by sequentially folding their clothes along fold line illustrations.

Another object of the invention is to provide a reward to children after completing a proper fold.

Another object of this invention is to teach children how to properly fold shirts, pants, and skirts.

These highly desirable and useful results are accomplished by the present invention of teaching children how to properly fold clothes.

Objects and advantages of the invention are set forth in part herein and in part will be readily appreciately here from, or may learned by practice with the invention, the same being realized and attained by means of instrumentalities and combinations pointed out in the appending specification and claims.

SUMMARY OF THE INVENTION

The present invention is directed towards overcoming the problems associated with teaching young children how to fold clothes. By placing either matching pairs of illustrations or fold line illustrations at predetermined locations on an article of clothing a child can learn how to properly fold by simply matching the appropriately placed illustrations in sequential order or by folding along the fold line illustrations in sequential order.

Additionally, by placing either the matching pairs of illustrations or fold line illustrations at various predetermined locations on an article of clothing or other object, different types of folds can be incorporated.

Additionally, by placing a reward illustration at a position where it would be visible upon completion of a proper fold the child can be rewarded for same.

Using the skills he or she has already learned, namely alphabetical or numeral progressions and by matching illustrations or fold line illustrations on the clothing, a child can learn how to properly fold clothes.

BRIEF DESCRIPTION OF THE DRAWINGS

The accompanying drawings, referred to below and constituting a part of the invention disclosed, illustrate principals and preferred embodiments of the present invention, and together with the description serve to explain the invention.

DETAILED DESCRIPTION OF THE PREFERRED EMBODIMENT

The present invention relates to clothing designed to teach children how to fold clothes. By placing matching pairs of illustrations or fold line illustrations at predetermined locations on an article of clothing or other object a child can be taught how to fold by either matching the pairs of illustrations or folding along the fold line illustrations in sequential order.

Disclosed below are various preferred embodiments of the claimed invention. Although the clothing disclosed in the figures and described herein are directed to shirts, pants, and skirts the claimed invention is not limited to same. As will be readily apparent to those skilled in the art, the present invention can be applied to any clothing item that requires folding. Additionally, the specific illustrations disclosed in the figures and described herein used for matching or identifying fold lines or indicating the proper fold sequence are for example purposes only and are not intended to limit the type of illustrations that can be used to practice the claimed invention. Also, as will be readily apparent to those skilled in the art, any type of pairs of matched illustrations or matching means incorporating some fold sequence indicating means can be used on the clothing. Finally, the fold patterns indicated in the accompanying figures and described herein are symmetrical. Therefore, any reference to left-right orientation can be reversed and still yield the same fold pattern.

FIGS. 1A–1F show a shirt containing alphabetic illustrations suitable for teaching a child how to perform a traditional shirt fold.

Figure 1A:
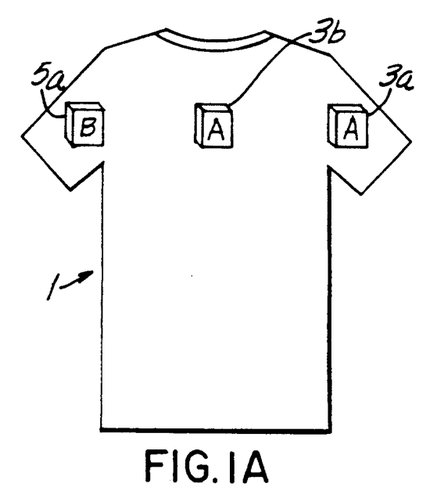
FIGS. 1A-1E are of a shirt showing the plurality of sequentially coded decorative illustrations used for teaching a child a traditional shirt fold. The placement of illustrations on the shirt and the steps performed to match those illustrations in order to properly fold the shirt are shown.

FIG. 1A shows the back of shirt 1 having matching decorative illustrations placed at predetermined locations. In the example shown in FIGS. 1A–1F, the illustrations used are blocks with letters of the alphabet indicated thereon. Accordingly, the matching pairs of illustrations are alphabetical blocks having the same letter. The fold sequence indicating means is the alphabetic progression of those blocks, that is, match block A, then block B, then block C.

Matching illustrations 3a and 3b, i.e., blocks A, used for the first folding step, are placed on the back right-hand sleeve and on the back center of shirt 1 respectively as shown in FIG. 1A. Matching illustration 5a and 5b used for the second fold (i.e., block B) are placed open the back left-hand sleeve of shirt 1 in a position opposite 3A and on the front right hand sleeve of shirt 1 as shown in FIG. 1B.

Figure 1B:
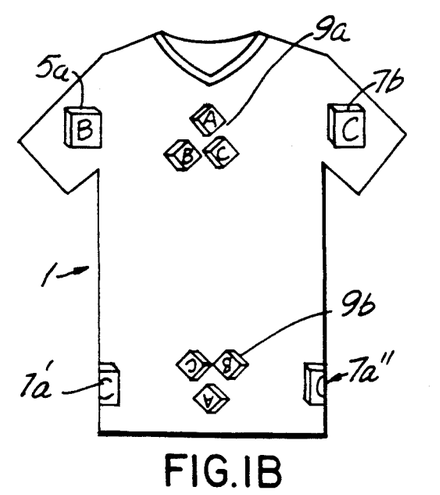

FIG. 1B shows the front of shirt 1 with additional illustrations placed at their proper predetermined locations for the particular fold disclosed. Specifically, illustration 5b is placed on the front side of the left sleeve opposite illustration 7b, on the front right-hand sleeve.

Matching illustrations 7a (formed by 7a' and 7a'' as discussed below) and 7b are used for the third fold, illustration 7b, i.e., block C is placed on the front left-hand sleeve opposite illustration 5b. Illustrations 7a' and 7a'' which, when aligned together after the completion of the second fold, form complete illustration 7a which is to be matched with illustration 7b. Illustrations 7a1 and 7b1 are located on the opposite sides of the front of shirt 1 near the bottom of the shirt. A reward illustration 9a may be placed on front of the shirt in the upper center portion. A second reward illustration 9b may be placed in upside-down orientation on the front of shirt at the lower center portion.

Figure 1C:
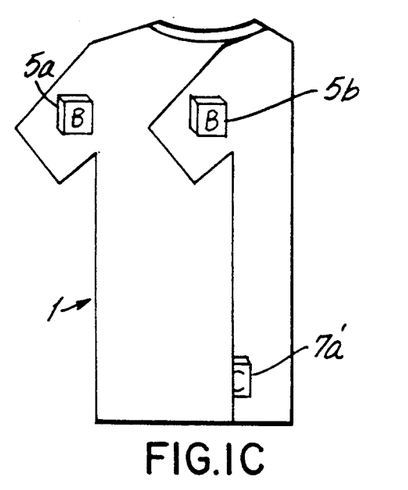
Figure 1D:
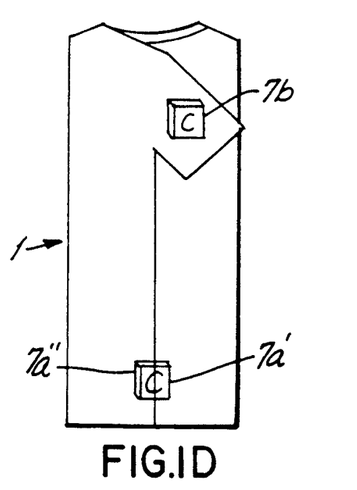
Figure 1E:
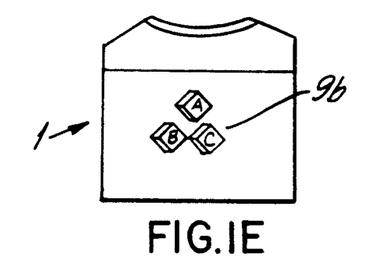
Figure 1F:
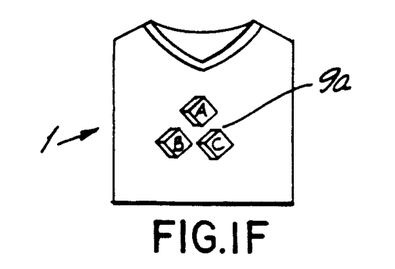

Once shirt 1 has been designed with the illustrations shown in FIGS. 1A and 1B a child can be taught how to fold the shirt. The child is first directed to place shirt 1 so its back, as shown in FIG. 1A, is up. The child is then taught to form the first fold by matching illustrations 3a and 3b, i.e., match the blocks marked with the letter "A". FIG. 1C shows the completed first fold with illustrations 3a and 3b matched but not visible. Once the first fold is completed, illustration 5b, placed on the front right-hand sleeve, becomes visible. The child is then taught to match illustrations 5a and 5b, i.e., the letter "B" blocks, to form the second fold. FIG. 1D shows the completed second fold with illustrations 5a and 5b matched but not visible and with illustrations 7a' and 7a'' aligned and visible as completed illustration 7a, i.e., the formed letter "C" block. The child is then taught to match the completed illustration 7a (i.e., the formed letter "C" block) with illustration 7b, the original letter "C" block, to form the third and final fold. FIG. 1E shows the completed third fold. If the optional reward illustration 9b has been placed on the front bottom of shirt 1 as described previously, reward illustration 9b is now visible to the child indicating the folding has been completed. Alternatively, if reward illustration 9b is not used, the child is then directed to turn the folded shirt 1 over to the front, as shown in FIG. 1F, to see reward illustration 9a on the front of shirt 1. By matching the matching pairs of illustrations in alphabetical order the child has learned to fold the shirt in a traditional manner.

Generally, it is preferable to instruct the child to perform all vertical folds in a right-side onto left-side manner and to perform all horizontal folds in a bottom on to top manner. This consistent pattern of folding will speed the learning process.

The use of matching pairs of sequentially ordered illustrations, here school blocks, with sequential letters placed on them aids the child in easily remembering how to perform each folding step. By following the alphabetical sequence A, then B, then C, the child is able to learn the proper folding steps by following the alphabet. It is readily apparent to those skilled in the art than any type of illustration can be used as a matching means, e.g., matching horses, turtles, flowers, and the like, without departing from the scope of the claimed invention, and that, in some cases (as shown in FIG. 1, the matching means may also serve as the fold sequencing means. Additionally, it is apparent that any kind of fold sequence indicating means can be used with the matching means, e.g., the alphabet, numbers, groups of items, numbered arrows, and the like, to indicate the proper fold sequence without departing from the scope of the claimed invention.

FIGS. 2A-2E show another form of the present invention wherein an easier shirt fold for children can be taught.

Figure 2A:
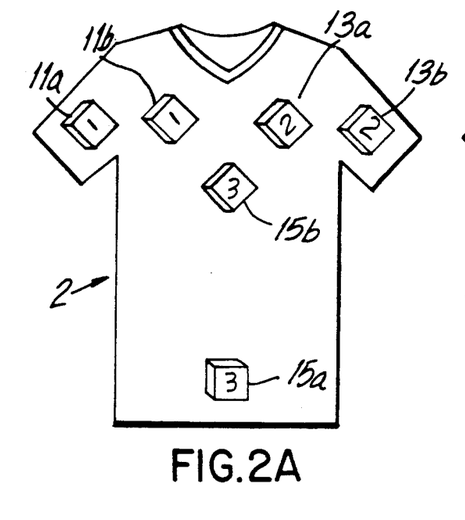
FIGS. 2A-2E are similar drawings of a shirt showing a different plurality of sequentially coded decorative illustrations used to teach children an alternative type of simpler fold using matching pairs of illustrations.

FIG. 2A shows the front of shirt 2 with matching pairs of illustrations placed thereon. Specifically, illustration 1'a (i.e., block "1" is placed on one sleeve, shown here as the right-hand sleeve, with matching illustration 1'b (i.e., block "a") placed on the upper right-hand portion of shirt 2. Illustration 13a (i.e., block "2") is placed on the opposite sleeve shown here as the left-hand sleeve, and illustration 13b (i.e., block "2" is placed on the upper portion of the body of the shirt 2 as shown. Illustrations 15a and 15b (i.e., block "3") are placed on the lower center and mid-center of shirt 2 respectively. The matching pairs of illustrations used for this example are again the same type of blocks used in FIGS. 1A-1F. Here, though, the fold sequence indicating means is a numeric progression, that is 1, then 2, then 3.

Figure 2B:
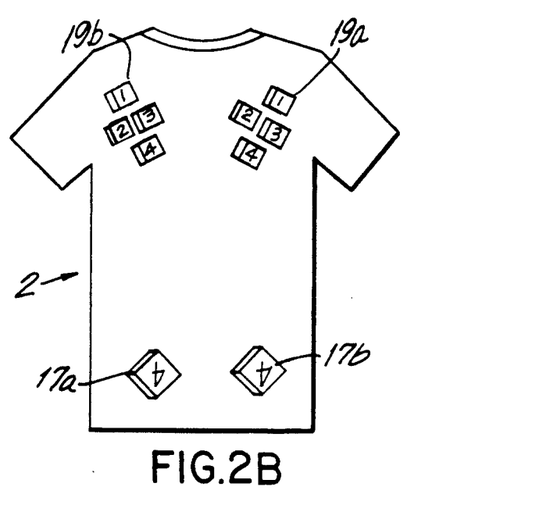

FIG. 2b shows the back of shirt 2 with matching illustrations 17a and 17b (i.e., block "4") located on the left-hand and right-hand sides of the lower portion of shirt 2. Both 17a and 17b can be optionally placed in an upside down orientation for proper viewing after the third fold. Reward illustrations 19a and 19b (i.e., grouped blocks "1", "2", "3", and "4") are placed on the upper right and left-hand shoulder portions respectively of shirt 2 as shown.

Figure 2C:
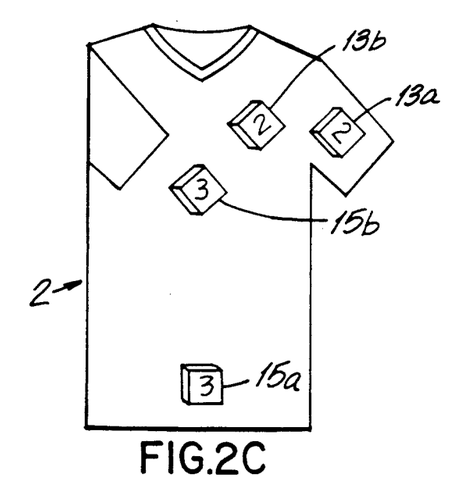
Figure 2D:
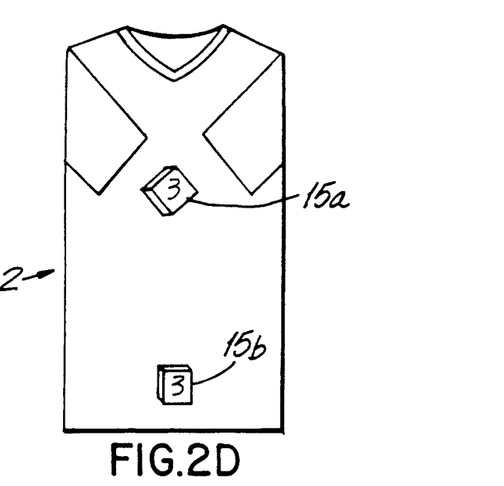
Figure 2E:
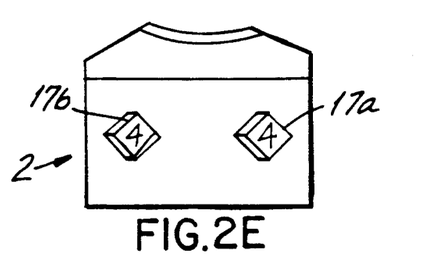
Figure 2F:
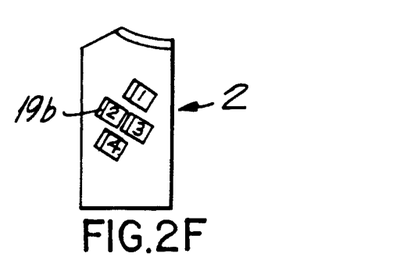

With the illustrations placed on the front and back of shirt 2, as shown in FIGS. 2A and 2B, the simple children's shirt fold can be described. First, the child is directed to place shirt 2 front-up with illustrations 11a, 11b, 13 1, 13b, 13a, and 15b (i.e., blocks "1", "2", and "3") visible as shown in FIG. 2A. The child is then taught to match illustrations 11a and 11b, here the number "1" blocks, to perform the first fold. FIG. 2C shows the completed first fold. The child is then taught to match illustrations 11a and 13b, here the number "2" blocks, to form the second fold as shown completed in FIG. 2D. The child is then taught to match illustrations 15a and 15b, there the number "3" blocks, to form the third fold. FIG. 2E shows the completed third fold if illustrations 17a and 17b are originally placed in an upside down orientation, as shown in FIG. 2B, then completion of the third fold orientates 17a and 17b in a right-side up configuration for the forth fold. To form the fourth and final fold the child is taught to match illustrations 17a and 17b, here the number "4" blocks, either by placing 17a onto 17b or by placing a 17b onto 17a. FIG. 2F shows the completed fourth fold with illustration 17a being folded on top of illustration 17b causing reward illustration 19a to become visible. Alternatively, folding 17b on top of 17a would cause reward illustrations 19b to become visible.

Although this second folding technique has one additional fold compared to the traditional fold as shown in FIGS. 1A-1F, the fold demonstrated in FIGS. 2A-2F is simpler to learn. Generally, the simplicity of the fold is due to the fact that the fold is more symmetrical than the fold described in FIGS. 1A-1F. Again, the use of matching illustrations and a fold sequence indicating means allows children to quickly learn how to fold their clothes using the concept of matching with a simple numbered progression.

FIGS. 3A-3D show a shirt having fold line illustrations for teaching a child how to fold the shirt in a traditional fold.

Figure 3A:
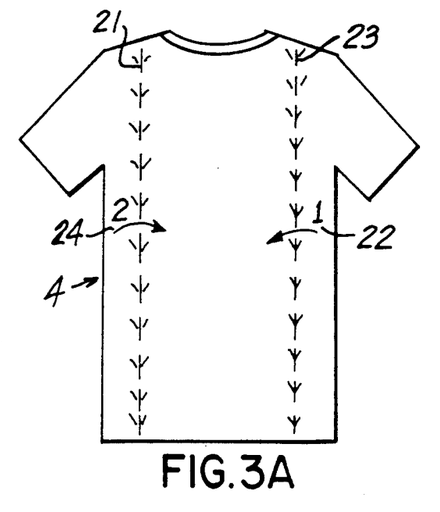
FIGS. 3A-3C are similar drawings of a shirt showing another different plurality of sequentially coded decorative illustrations used to teach children a traditional shirt fold using fold line illustrations.

FIG. 3A shows the back of shirt 3 with fold line illustrations 21 and 23 running vertically down the back of shirt 4. Here, the fold line illustrations are foot prints. It will be apparent to those skilled in the art that any type of illustration may be used to indicate a fold line, e.g., road lines, racing stripes, rope, and the like. Numbered arrow, illustrations 22 and 24, serve as the fold sequence indicating means.

Figure 3B:
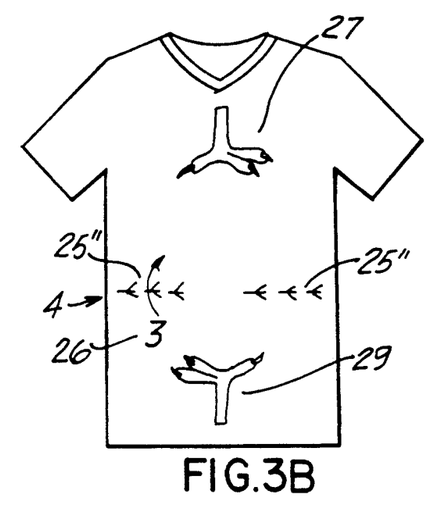

FIG. 3B shows the front of the shirt 3 with partial fold line illustrations 25' and 25" running horizontally across the front part of shirt 4. Additionally, numbered arrow illustration 26 is placed below partial fold line 27" so as to be visible upon completion of the second fold. Reward illustrations 27 and 29, here bird feet, are placed at the top and bottom centers of shirt 4.

Figure 3C:
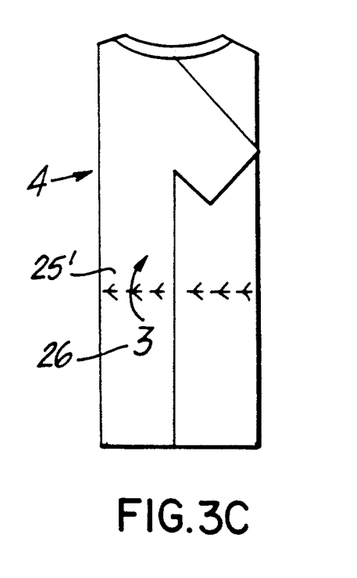
Figure 3D:
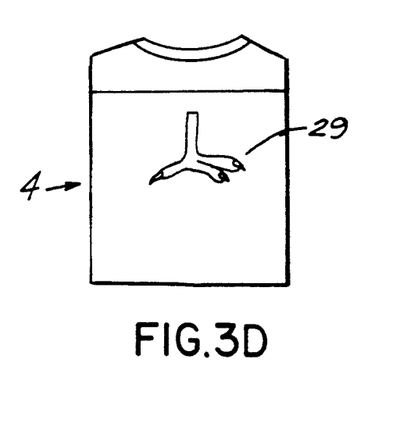

Once fold line illustrations 21, 23, 25' and 25" along with numbered arrows 22, 24 and 26 are placed on the front and back of shirt 3 as shown in FIGS. 3A and 3B a child can be taught the traditional fold using fold line illustrations described. By placing shirt 4 on its back, as shown in FIG. 3A, the child is directed to follow arrow indicator number 1 (illustration 22) to fold the left-hand sleeve along fold line 23. The chile is then directed to follow arrow indicator number 2 (illustration 24) to fold the right-hand sleeve along the other fold line (illustration 21). FIG. 3C shows shirt 3 after completion of the first two folds. Once the first two folds are completed, the partial horizontal fold lines (illustrations 25' and 25") meet to form a completed horizontal third fold line (illustration 27). The child is then directed by arrow indicator 3 (illustration 26) to fold shirt 3 along the fold line indicator (illustration 27' as shown in FIG. 3C. FIG. 3D shows the completed third fold with the reward picture (illustration 29) now visible.

By placing fold line illustrations on a shirt as described in FIGS. 3A-3D, a child can be taught how to perform a traditional shirt fold.

FIGS. 4A-4E show a shirt with matching illustrations for forming a different fold.

Figure 4A:
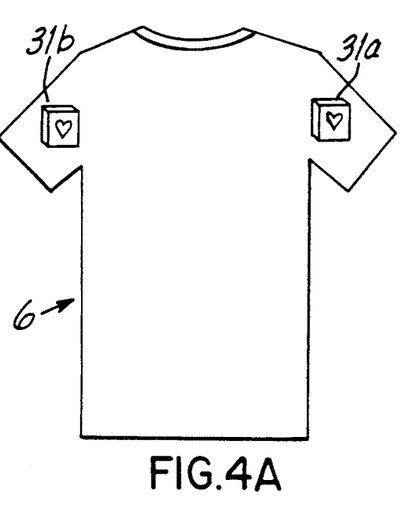
FIGS. 4A–4E are similar drawings of a shirt showing another different plurality of sequentially coded decorative illustrations used to teach children yet another type of shirt fold using matching pairs of illustrations.

FIG. 4A shows the back of shirt 4 with matching blocks with one heart (illustrations 31a and 31b) placed on opposite sleeves as shown. Here, illustration 31a is placed on the right-hand sleeve and illustration 31b is placed on the left-hand sleeve.

Figure 4B:
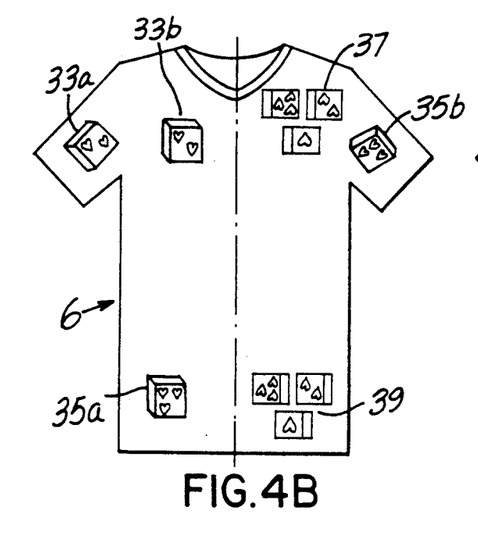

FIG. 4B shows the front of shirt 4 with matching illustrations placed at the proper predetermined locations (i.e., blocks). Here, a block with two hearts (illustration 33a) is placed on the right hand sleeve and matching block (illustration 33b) is placed on the upper portion of shirt 4 to the right of shirt 1's vertical center line and directly opposite block 33a on the sleeve. A block with three hearts (illustration 33a) is placed on the lower portion of the shirt, again to the right of shirt 1's vertical center line. The matching block with three hearts (illustration 35b) is placed on the left-hand sleeve as shown. A reward illustration consisting of a group of three blocks showing one, two and three hearts (illustration 37) is placed on the upper portion of shirt 4 to the left of shirt 1's vertical center line and in an upside-down orientation (i.e., so the bottom of the heart is at the top of the block). Additionally, a matching reward (illustration 39) is placed on the lower portion of shirt 4 to the left of shirt 1's vertical center line also in an upside-down orientation.

Here, the matching pairs of illustrations are school blocks and fold sequence indicating means is the numerical progression of hearts placed with the blocks. Thus, the child is directed to match the blocks having one heart first, then to match the hearts having two blocks second, and to match the blocks having 3 hearts last.

Figure 4C:
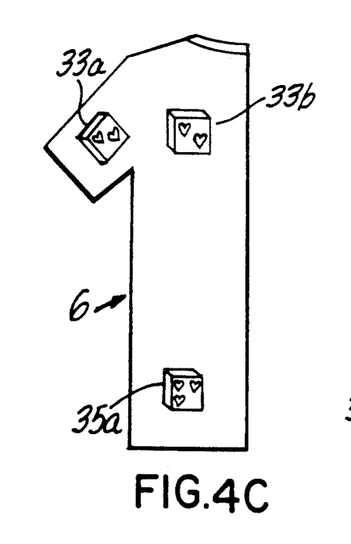
Figure 4D:
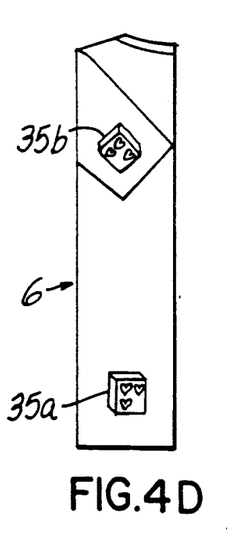
Figure 4E:
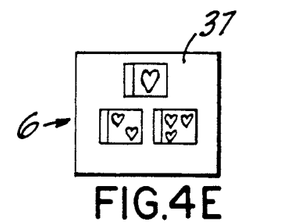
Figure 4F:
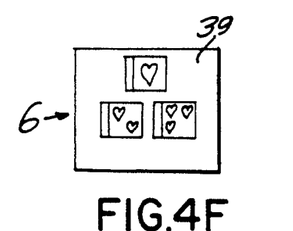

With shirt 4 illustrated as shown in FIGS. 4A and 4B the child is instructed to form the first fold by matching the block with one heart (illustration 31a) with the other block with one heart (illustration 31b). FIG. 4C shows the completed first fold. The child is then instructed to form the second fold by matching the block with two hearts (illustration 33a) with the other block with two hearts (illustration 33b). FIG. 4D shows the completed second fold. The child is directed to form the third and final fold by matching the block with three hearts (illustration 33a) with the other blocks with three hearts. If the child matches illustration 35a with the matching block on the sleeve (illustration 35b) is rewarded with the group of blocks (illustration 37), the block on the bottom of the shirt as shown in FIG. 4E. Alternatively, if the child matches the block with three hearts on the sleeve (35b) with the matching block (33a) on the shirt bottom, the child is rewarded with the group of blocks (39), as shown in FIG. 4F.

FIGS. 5A-5D show the method and apparatus of the present invention for teaching a child how to fold a pair of long pants.

Figure 5A:
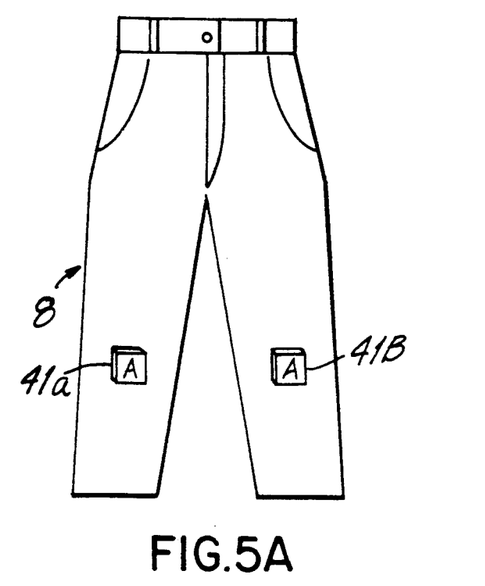
FIGS. 5A–5C are of a pair of pants showing another different plurality of sequentially coded decorative illustrations used for teaching a child how to fold the pants by using matching pairs of illustrations.

FIG. 5A show the front of pants 8 with illustrations 41a and 41b placed at approximately the knee position.

Figure 5B:
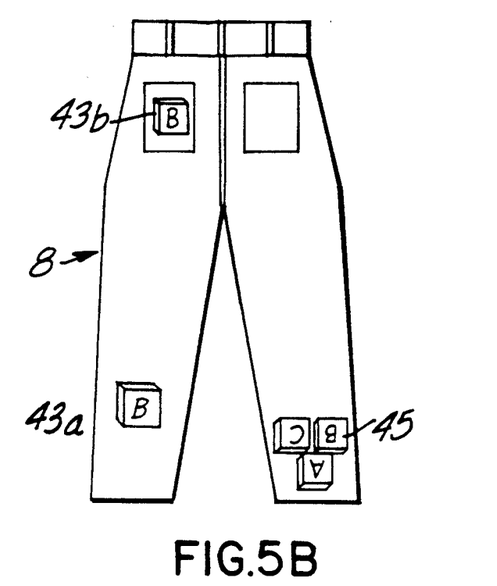

FIG. 5B shows the back of pants 8 with illustrations 43a placed at the lower portion of a leg of pants 2, here shown on the lower left-hand pants leg. Illustration 43b is placed on the corresponding buttocks portion, shown here on the left-hand pocket. Finally, reward illustration 45 is placed on the lower portion of the leg opposite illustrations 43a and 43b, here the right-hand leg, in an upside down orientation as shown.

Figure 5C:
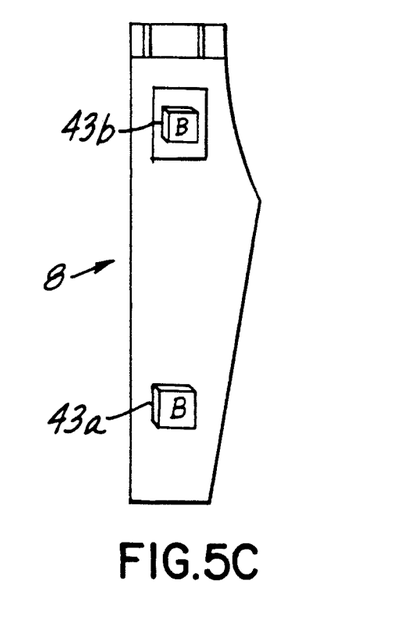
Figure 5D:
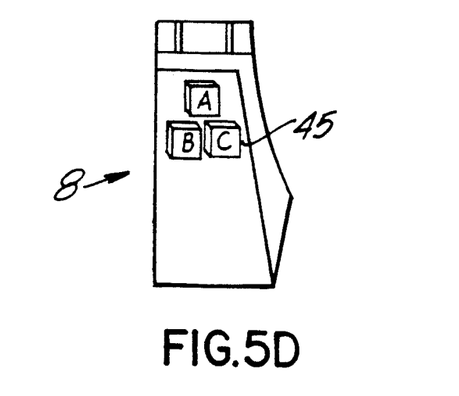

Once pants 2 are illustrated as shown in FIGS. 5A and 5B, the procedure for teaching a child how to fold a pair of long pants can be described. First, the child is taught to match illustration 41a with illustration 41b to perform the first fold. FIG. 5C shows the completed first fold. The child is then taught to match illustration 43a with illustration 43b to perform the second fold. FIG. 5D shows the completed second fold. Once the second fold is completed, the child can see reward illustration 45 indicating that has completed the proper fold for pants 2 as shown in FIG. 5D.

Figure 6A:
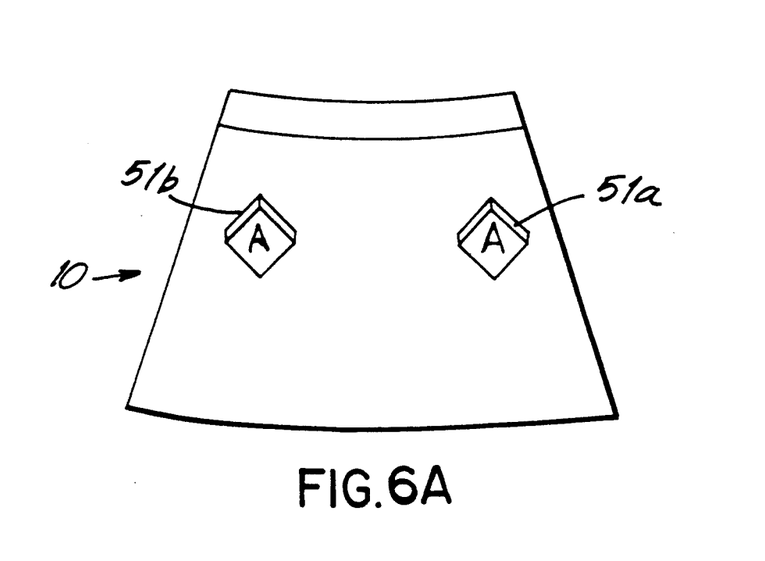
FIGS. 6A–6C are of a skirt incorporating the method showing another different plurality of sequentially coded decorative illustrations used for teaching a child how to fold the skirt by using a matching pair of illustrations.
Figure 6B:
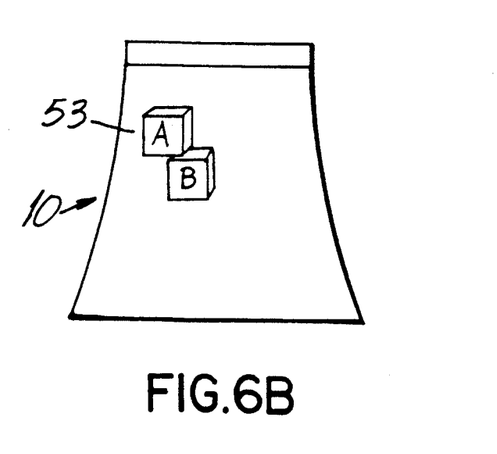

FIGS. 6A and 6B show a method and apparatus of the present invention for teaching a child how to fold a shirt.

Figure 6C:
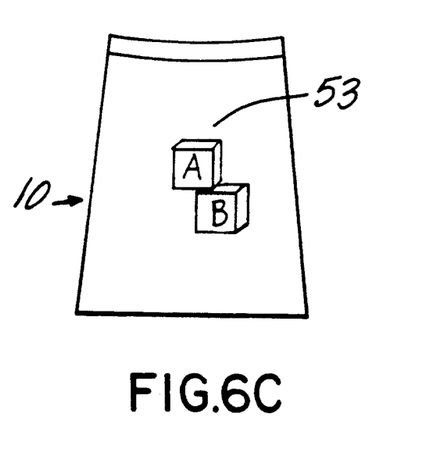
Figure 7A:
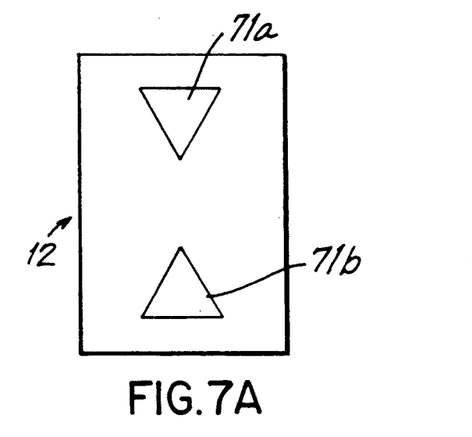
Figure 7B:
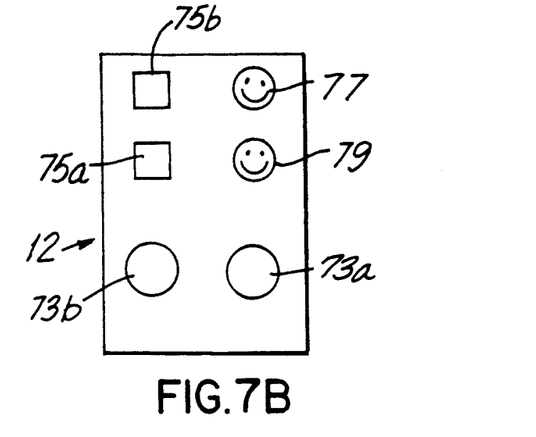
Figure 7C:
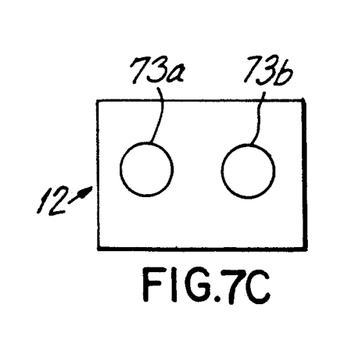
Figure 7D:
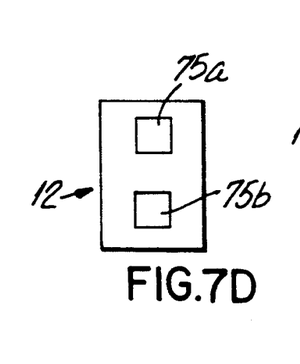
Figure 7E:
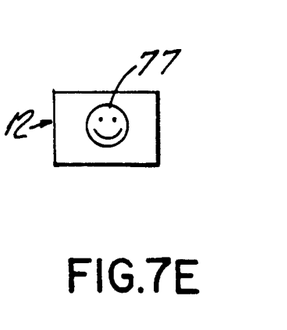

FIG. 6A shows the proper placement of illustrations 51a and 51b. Specifically, 51a is placed on the front right-hand portion of skirt 10 and illustration 51b is placed on the front left-hand portion of same. FIG. 6B shows the back of skirt 10 having reward illustration 53 on the back left-hand side of skirt 10. Having illustrated skirt 10 as shown in FIGS. 6A and 6B, the method and apparatus for teaching a child how to fold a skirt can be described. Specifically, the child is taught to place skirt 10 in a position where illustrations 51a and 51b are visible. The child is then instructed to fold illustration 51a on top of illustration 51b to perform the fold. The completed fold is shown in FIG. 6C. Upon completion of the proper fold, the child is rewarded with reward illustration 53 as shown in FIG. 6C.

The use of the above-described matching indicia for teaching children how to fold clothes can be applied to numerous articles of clothing which require folding without departing from the spirit of the invention.

The advantage of the present clothing is apparent. Children have an opportunity to participate with their parents in taking care of their clothes while at the same tim learning proper folding techniques. Optionally, the folding is enhanced by the child receiving a reward indicia for completing the folding.

The claimed invention also allows one to take advantage of new disappearing inks that are currently available on the market. These inks become invisible when heated and gradually disappear as the ink and cloth cool. With such inks, one could imprint the various matching pairs of illustrations of fold line illustrations to thereby allow children to fold their clothes upon removing them from a dryer. After the article of clothing is properly folded, the cooling of the cloth and ink will cause the illustrations to gradually disappear yielding an article of clothing with no apparent illustrations.

Additionally, the pairs of matching indicia and folding line illustrations can be ornamental in character allowing them to serve a dual purpose of teaching children how to properly fold their clothes while ornamenting various articles of clothing.

It will thus be seen that the objects set forth above, among those made apparent from the preceding description, are efficiently attained since certain changes may be made in the above clothing without departing from the scope of the invention, it is intended that all matter contained in the above description and shown in the accompanying drawings shall be interpreted as illustrative and not limiting.

It is also understood that the following claims are intended to cover all of the generic and specific features of the invention which, as a matter of language, might be said to fall between.

I claim:

1. A shirt which comprises a front, a back, a first sleeve, a second sleeve, a neck, a bottom, and a plurality of sequentially coded decorative indicia on the outer surface of the shirt, which indicia comprise:

(a) a first pair of sequentially coded matching decorative indicia having two members, with one member of the pair being located on the back of the first sleeve and with the other member of the pair being located on the shirt's back in the center near the neck;

(b) a second pair of sequentially coded matching decorative indicia having two members, with one member of the pair being located on the back of the second sleeve, with the other member of the pair being located on the first of the first sleeve, and with the members being aligned in similar positions on the sleeves;

(c) a sequentially coded decorative index located on the front of the second sleeve and aligned in a similar position with the member on the first of the first sleeve; and (d) a pair of complimentary decorative indicia located opposite each other on the shirt's front of each side near the bottom, with the complimentary indicia forming the sequentially coded decorative index of (c) when the sides of the shirt are folded so they meet;

wherein the indicia of (a) and (b) are different, wherein the index of (c) is different from the indicia of (a) and (b) but the same as the index formed when the complimentary indicia of (d) are matched, and wherein a sequence begins with the indicia of (a) and ends with the index of (c).

2. The shirt of claim 1, wherein the pair of matching indicia are the letter A, numeral 1, or one object; wherein the second pair of matching indicia are the letter B, numeral 2, or two objects; wherein the third pair of matching indicia are the letter C, numeral 3, or three objects; wherein the pair of complimentary indicia are part of the letter C, numeral 3, or three objects, and wherein the indicia are all letters, all numerals, or all objects.

3. The shirt of claim 1, wherein the matching indicia are blocks with the letters A, B, and C thereon; blocks with the numerals 1, 2, and 3 thereon; or blocks with one object, two objects, and three objects, thereon.

4. The shirt of claim 1, further comprising a decorative reward located on the shirt's front at the center near the top and optionally a second decorative reward located on the shirt's back at the center near the bottom.

5. The shirt of claim 4, wherein the decorative reward is a group of the letters A, B, and C when the decorative indicia are letters, a group of the numerals 1, 2, and 3 when the decorative indicia are numerals, or a group of one object, two objects, and three objects when the decorative indicia are objects.

6. The shirt of claim 5, wherein the decorative reward or rewards are three blocks with the letters A, B, and C, thereon; three blocks with the numerals 1, 2, and 3, thereon; or three blocks with one object, two objects, and three objects, thereon.

7. A shirt which comprises a front, a back, a first sleeve, a second sleeve, a neck, a bottom, and a plurality of sequentially coded decorative indicia on the outer surface of the shirt, which indicia comprises:

(a) a first pair of sequentially coded matching decorative indicia having two members, with one member of the pair being located on the front of the first sleeve and with the other member of the pair being located on the shirt's front between the center and the side having the first sleeve and aligned in a similar position with the first member;

(b) a second pair of sequentially coded matching decorative indicia having two members, with the first member of the pair being located on the front of the second sleeve and with the other member of the pair being located on the shirt's front between the center and the side having the second sleeve and and aligned in a similar position with the first member of the second pair;

(c) a third pair of sequentially coded matching decorative indicia having two members, with the first member of the pair being located on the shirt's front near the center and with the other member of the pair being located on the shirt's front near the center and aligned in a similar position below the first member; and (d) a fourth pair of sequentially coded matching decorative indicia having two members, with the first member of the pair being located on the shirt's back at the one side near the bottom and with the other member of the pair being located on the shirt's back at the other side near the bottom and aligned in a similar position with the first member;

wherein all of the pairs are different and wherein a sequence starts with the first pair and ends with the fourth pair.

8. The shirt of claim 7, wherein the first pair of matching indicia are the letter A, numeral 1, or one object; wherein the second pair of matching indicia are the letter B, numeral 2, or two objects; wherein the third pair of matching indicia are the letter C; numeral 3, or three objects; wherein the fourth pair of matching indicia are the letter D, numeral 4, or four objects; and wherein the indicia are all letters, all numerals, or all objects.

9. The shirt of claim 7, wherein the matching indicia are blocks with the letters A, B, and C thereon; blocks with the numerals 1, 2, and 3 thereon; or blocks with one object, two objects, and three objects thereon.

10. The shirt of claim 7, further comprising a pair of decorative rewards, with the first member of the pair being located on the shirt's front near the center and below the neck and with the second member of the pair being located on the shirt's back near the center and above the bottom.

11. The shirt of claim 10, wherein the decorative rewards are three blocks with the letters A, B, and C thereon; three blocks with the numerals 1, 2, and 3 thereon; or three blocks with one object, two objects, and three objects thereon.

12. A shirt which comprises a front having a center, a back, a first sleeve, a second sleeve, a neck, a bottom, and a plurality of sequentially coded decorative indicia on the outer surface of the shirt, which indicia comprise:

(a) a first pair of sequentially coded matching decorative indicia having two members, with each member being located on the back of the sleeves and aligned in similar positions on the sleeves;

(b) a second pair of sequentially coded matching decorative indicia having two members, with the first member of the pair being located on the front of the first sleeve and with the second member of the pair being on the shirt's front between the center and the side having the first sleeve and aligned in a similar position with the first member; and (c) a third pair of sequentially coded matching decorative indicia having two members, with the first member of the pair being located on the shirt's front near the bottom on the same side as the second set of indicia and with the other member of the pair being located on the front of the second sleeve and aligned in a similar position with the indicia on the front of the first sleeve;

wherein all of the pairs are different and wherein a sequence starts with the first pair and ends with the third pair.

13. The shirt of claim 12, wherein the first pair of matching indicia are the letter A, numeral 1, or one object; wherein the second pair of matching indicia are the letter B, numeral 2, or two objects; wherein the third pair of matching indicia are the letter C, numeral 3, or three objects; and wherein the indicia are all letters, all numerals, or all objects.

14. The shirt of claim 12, wherein the matching indicia are blocks with the letters A, B, and C thereon; blocks with the numerals 1, 2, and 3 thereon; or blocks with one object, two objects, and three objects thereon.

15. The shirt of claim 12, further comprising identical decorative reward designs located on the front of the shirt at the top and bottom and on the opposite side of the shirt from the side on which the second pair of matching designs is located.

16. The shirt of claim 15, wherein the decorative rewards are blocks with the letters A, B, and C thereon; blocks with the numerals 1, 2, and 3 thereon; or blocks with one object, two objects, and three objects thereon.

17. A shirt which comprises a front, a back, a first sleeve, a second sleeve, a neck, a bottom, and decorative matching fold lines, directional indicia, and decorative matching objects with comprises:

(a) a pair of matching fold lines having two members, with the first member of the pair being on one side of the shirt's back and the other member of the pair being on the other side of the shirt's back and aligned in a similar position with the first member, and with the fold lines running from the near the neck to the bottom of the shirt;

(b) a pair of partial matching fold lines having two members, with the members being aligned in similar positions with each other on the shirt's front and located at the shirt's sides below the sleeves;

(c) directional indicia located on the shirt's back near each fold line and a directional index on the shirt's front near one of the partial fold lines; and (d) a pair of matching objects located on the shirt's front, with the first member of the pair being in the shirt's center near the neck, with the second member of the pair being in the shirt's center near the bottom, and with the second member being upside down as compared to the first member so that the objects match when the shirt is folded along the partial matching fold lines.

18. The shirt of claim 17, wherein the fold lines and partial fold lines are a series of the same small designs and wherein the directional indicia are arrows identified with sequential letters or numerals indicating which line is folded first, which is folded second, and which is folded third.

* * * * *